(12) United States Patent
Tandy, Jr. et al.

(10) Patent No.: US 7,734,405 B2
(45) Date of Patent: Jun. 8, 2010

(54) METHOD FOR ENHANCING STABILITY OF PRIME MOVER HAVING AN AUXILIARY VEHICLE

(75) Inventors: Donald Frank Tandy, Jr., The Woodlands, TX (US); Donald Frank Tandy, Sr., Beavercreek, OH (US)

(73) Assignee: Tandy Engineering & Associates, Inc., The Woodlands, TX (US)

( * ) Notice: Subject to any disclaimer, the term of this patent is extended or adjusted under 35 U.S.C. 154(b) by 1071 days.

(21) Appl. No.: 11/416,597

(22) Filed: May 3, 2006

(65) Prior Publication Data
US 2007/0256878 A1 Nov. 8, 2007

(51) Int. Cl.
*B60T 8/24* (2006.01)
*B60S 9/00* (2006.01)

(52) U.S. Cl. .................. 701/70; 303/146; 303/148; 180/204

(58) Field of Classification Search .............. 701/70, 701/96, 116, 50, 71, 72; 303/146, 148, 149, 303/191; 180/204, 6.24, 14.2, 335; 280/428; 188/273
See application file for complete search history.

(56) References Cited

U.S. PATENT DOCUMENTS

| | | | |
|---|---|---|---|
| 5,488,352 A | 1/1996 | Jasper | |
| 5,693,985 A | 12/1997 | Gee et al. | |
| 5,739,592 A | 4/1998 | Rigsby et al. | |
| 5,747,683 A | 5/1998 | Gerum | 73/118.1 |
| 5,814,771 A | 9/1998 | Oakes et al. | |
| 5,990,788 A | 11/1999 | Syracuse | 340/458 |
| 6,042,196 A | 3/2000 | Nakamura | 303/7 |
| 6,523,911 B1 | 2/2003 | Rupp et al. | |
| 6,668,225 B2 * | 12/2003 | Oh et al. | 701/70 |
| 6,957,873 B2 | 10/2005 | Wanke | 303/140 |
| 6,959,970 B2 | 11/2005 | Tseng | |
| 7,447,585 B2 | 11/2008 | Tandy et al. | |
| 7,561,953 B2 | 7/2009 | Yu | |
| 2002/0107627 A1 * | 8/2002 | Funke et al. | 701/70 |
| 2003/0117011 A1 | 6/2003 | Ackley | |
| 2003/0160428 A1 | 8/2003 | Lindell et al. | |
| 2005/0236894 A1 * | 10/2005 | Lu et al. | 303/139 |
| 2005/0236896 A1 * | 10/2005 | Offerle et al. | 303/146 |
| 2006/0125313 A1 | 6/2006 | Gunne et al. | |
| 2007/0257549 A1 | 11/2007 | Tandy et al. | |
| 2007/0260385 A1 | 11/2007 | Tandy et al. | |
| 2008/0177454 A1 | 7/2008 | Bond et al. | |

* cited by examiner

*Primary Examiner*—Khoi Tran
*Assistant Examiner*—Ronnie Mancho
(74) *Attorney, Agent, or Firm*—Buskop Law Group, PC; Wendy Buskop

(57) ABSTRACT

A method for providing enhanced stability, control and management for a prime mover connected to an auxiliary vehicle is disclosed. An auxiliary vehicle is connected to a prime mover with an auxiliary stability enhancing system and an electronic stability enhancing system, including at least one processor with a memory having computer instructions stored thereon. The processor communicates with a plurality of sensors to detect force values and motions values, and communicates with database storage containing specifications and characteristics representing the prime mover and auxiliary vehicle to compare the force and motion values with the specifications to determine if any values exceed known preset threshold values for the prime mover and auxiliary vehicle. A calculated response, and a location for applying the response, is determined by using a computer model of the prime mover and auxiliary vehicle to reduce the detected force or motion value that exceeds the preset threshold value.

8 Claims, 2 Drawing Sheets

METHOD FOR ENHANCING STABILITY OF PRIME MOVER HAVING AN AUXILIARY VEHICLE

FIELD

The present embodiments relate generally to a method for assisting with stability, control, and management for a prime mover and an auxiliary vehicle.

BACKGROUND

Safety systems for vehicles have evolved through the years and have been improved upon by enhancements such as intervention into the suspension, steering, brakes, or engine management of the driving engine for the vehicle. Such enhancements include: traction slip control to prevent the spinning of the wheels of the vehicle, brake force proportioning to regulate the ratio of brake forces between the front axle and rear axle of the vehicle, anti-lock brakes, and electronic stability control which can affect driving conditions of the vehicle during yawing of the vehicle about its vertical axis.

In electronic stability control systems for vehicles, it is necessary to be able to assess the behavior of the vehicle, particularly if the assessment and any response can be accomplished in real time. These systems that assess vehicle motion, accomplish this assessment in real time and rely on the ability to monitor the movements of the vehicle by installing sensors to measure the acceleration of the vehicle and the angular rotational rates of the vehicle.

During normal driving, the vehicle responds to the driver's commands, and the driver maintains control of the vehicle. However, if the driver operates the vehicle beyond his/her limits or even the limits of the vehicle, the vehicle can exhibit a spin response as a yaw movement in excess of that required for the situation, or a plow response as a yaw movement less than that required for the situation. A system such as the Electronic Stability Program (ESP) can provide some correction to the motions of the vehicle in certain situations by using mathematical models that consider the vehicle dynamics and forces of the tires of the vehicle along with measurements supplied by sensors recording vehicle speed, yaw rate, and actions of the driver of the vehicle, such as the steering wheel and the application of the brakes and accelerator.

However, the use of Electronic Stability Program mathematical models can have some limitations with respect to how much a motion can be corrected or whether a driver will respond appropriately. In addition, such systems function by observing movements of the body of the vehicle, only, and do not extend to any auxiliary vehicle, such as a trailer connected to the vehicle. Accordingly, all forces affecting the performance of a combination vehicle and trailer would not be included in the mathematical model of the Electronic Stability Program as the information is gathered from the vehicle, only. Also, many of the existing Electronic Stability Program systems do not include determinations of whether a trailer is attached to the tow-vehicle.

Thus, a need exists for a method that provides direct assessment, direct response, and multiple actions applied in real time and based upon determinations of driver inputs regarding a prime mover connected to an auxiliary vehicle along with the direct measurements of forces and motions as well as calculated responses using information gathered from the prime mover and the connected auxiliary vehicle assembly.

Further, a need exists for a method that provides the ability for stabilization, driving control, and safety management of a prime mover connected with an auxiliary vehicle by using a model which includes the prime mover and the auxiliary vehicle assembly, and using computer instructions for determining direct responses in real-time for optimizing the safe performance of the combination of the prime mover with the connected auxiliary vehicle. Such a system can provide for an improved optimization of the electronic stability control system of the vehicle when the vehicle is pulling a trailer.

The present embodiments of the invention meet these needs.

SUMMARY

The present embodiments relate generally to a method for assisting with stability, control, and management for a prime mover connected to an auxiliary vehicle.

The method can begin by connecting an auxiliary vehicle to a prime mover with an auxiliary stability enhancing system and an electronic stability enhancing system. The stability enhancing systems can include a computer with at least one processor and a memory having computer instructions for communicating with a plurality of sensors and a database storage. The plurality of sensors can be located on the prime mover and on the auxiliary vehicle. The database storage can be located on the prime mover and the auxiliary vehicle and can contain specifications representing the prime mover and specifications representing the auxiliary vehicle.

The embodiments include an on-board computer having at least one processor that can be located on the prime mover and that can communicate with a plurality of sensors, located on the prime mover, the auxiliary vehicle, and combinations thereof, to detect at least one force value, at least one motion value, and combinations thereof. The processor located on the prime mover can communicate with a database storage containing specifications representing the prime mover and specifications representing the auxiliary vehicle for conducting comparative analyses. The analyses include at least one detected force value, at least one detected motion value, and combinations thereof, being compared to the specifications of the prime mover and the specifications of the auxiliary vehicle. These comparisons can be performed to determine if any detected force values, motion values, and combinations thereof, exceed any known preset threshold values, or preset limits, for the prime mover connected to the auxiliary vehicle.

The method can continue by providing a calculated response based on the comparison to the preset threshold value or the preset limit stored in the memory of the stability enhancing systems, such as selectively applying braking to one wheel of the prime mover to reduce the detected force value or detected motion value that exceeds the preset threshold value for the prime mover connected to the auxiliary vehicle.

Next, an adjustment value for the prime mover connected to the auxiliary vehicle can be calculated to adjust the detected at least one force value, the detected at least one motion value, and combinations thereof. Then, the selected response or calculated adjustment can be adjusted further if the reduced force, motion, and combinations thereof, of the prime mover connected to the auxiliary vehicle causes excessive motions of the prime mover and/or the auxiliary vehicle, such as yaw, pitch, rolling, sliding, swaying, and combinations thereof.

BRIEF DESCRIPTION OF THE DRAWINGS

The detailed description will be better understood in conjunction with the accompanying drawings as follows.

Figure 1:
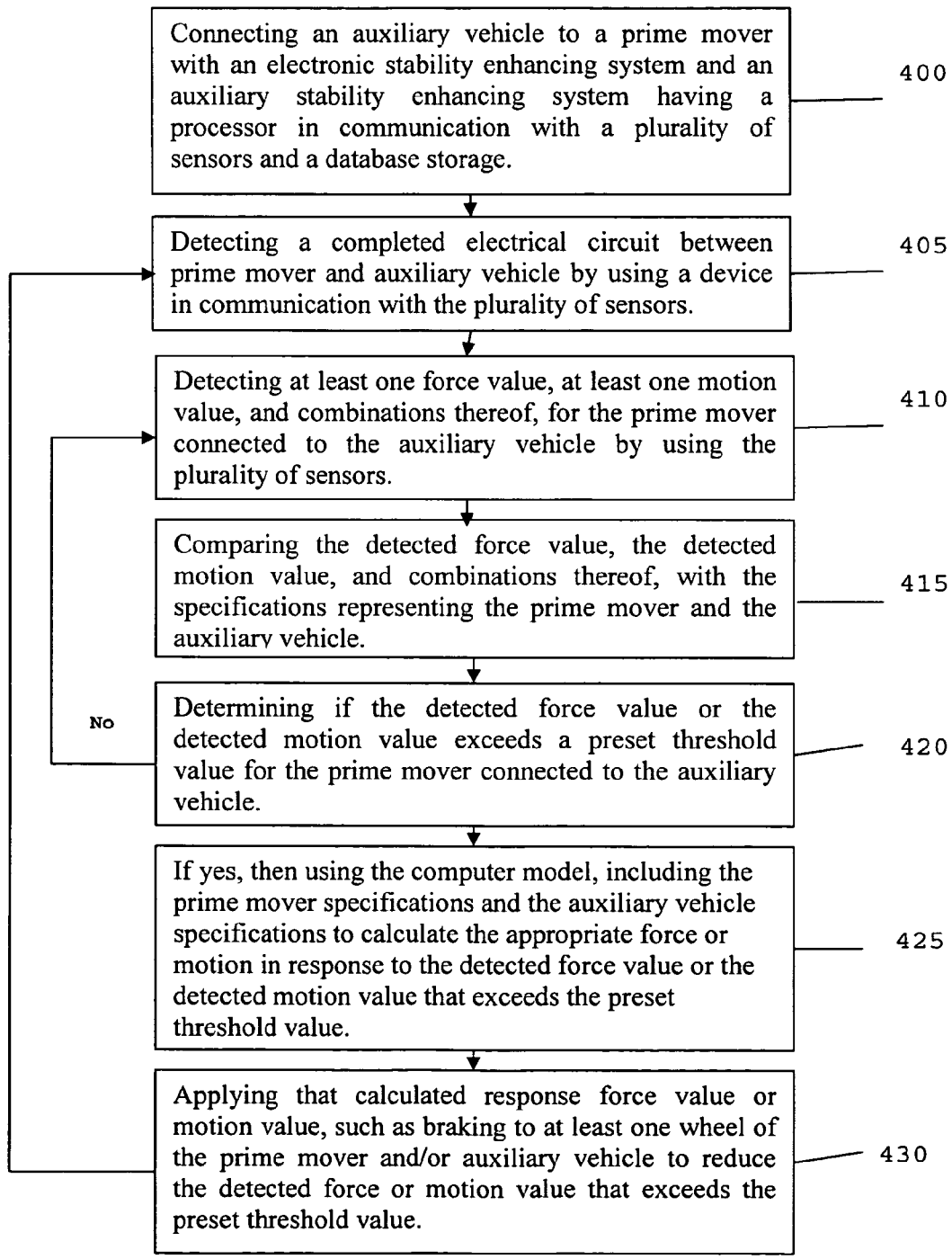
FIG. 1 depicts a flow diagram of an embodiment of a method for stabilizing a prime mover connected to an auxiliary vehicle.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the embodiments can be practiced or carried out in various ways.

The present embodiments relate generally to a method for assisting with stability, control, and management for a prime mover connected to an auxiliary vehicle.

The embodiments of the method provide the benefit of an improved electronic stability control system for handling, steering, and stabilizing a prime mover connected to an auxiliary vehicle. The embodiments provide a method which may reduce crash risks and cargo spillage on roadways, including spillage of hazardous cargo on roadways pulled in tandem auxiliary vehicles by trucks or other prime movers, in some situations. The embodiments of the invention can provide a reduction in swaying, rolling, and jackknifing of the auxiliary vehicle connected to a prime mover to prevent wrecks in some situations.

The method can begin with an auxiliary vehicle connecting to a prime mover with an auxiliary stability enhancing system, that can be located on the auxiliary vehicle or the prime mover, and an electronic stability enhancing system located on the prime mover.

The stability enhancing systems can include a computer with at least one processor and a memory comprising computer instructions for communicating with a plurality of sensors and a database storage. The database storage can contain specifications representing the prime mover and specifications representing the auxiliary vehicle.

A prime mover usable in the embodiments of the method can be a motorized vehicle comprising at least two wheels, such as: a passenger car, a tractor, a sport utility vehicle (SUV), a van, a recreational vehicle, a bus, a pick-up truck or other truck with a gross vehicle weight rating (GVWR) of less than or equal to 20,000 pounds, a medium or heavy truck with a gross vehicle weight rating (GVWR) range of over 20,000 pounds, a semi-truck, or other motorized vehicle. Semi-trucks can be connected to or can tow semi-trailers or tandem trailers. Examples of manufacturers of semi-trucks include: Volvo, Peterbilt, Kenworth, and other semi-truck manufacturers.

The prime mover includes a brake adjacent to each wheel of the tow-vehicle, such as an electric brake manufactured by Visteon Corporation of Van Buren Township, Mich., a surge brake manufactured by U-Haul Corporation of Phoenix, Ariz., a hydraulic brake manufactured by Bosch Corporation of Chicago, Ill., a pneumatic brake manufactured by Bendix Corporation of Frankfort, Ky., and combinations thereof.

The embodiments include the prime mover towing an auxiliary vehicle, in which the auxiliary vehicle can be: an equipment trailer such as a Millennium heavy equipment trailer, a utility trailer such as a Millennium utility trailer, a tandem trailer such as a Titan tandem axle cargo trailer, an enclosed trailer such as a Titan enclosed gooseneck trailer, a work trailer such as a Millennium dump trailer for hauling dirt, a horse trailer such as an Exiss horse trailer, a car hauler trailer such as a Featherlite and Pace car hauler trailer or a Featherlite race car trailer, a motorcycle trailer such as a Haulmark motorcycle trailer, a Coleman pop-up trailer, a recreational trailer such as an Airstream recreational trailer, a house trailer made by such manufacturers as American Homestar Homes, a boat trailer such as a Donzi or Shorelander boat trailer, a semi-trailer such as a Fruehauf Transport Trailer or a Fruehauf Tanker Trailer, a commuter car, a cart such as a golf cart, or other trailers having at least two wheels.

The auxiliary vehicle can include a brake adjacent to at least one wheel of the auxiliary vehicle. In an alternative embodiment, the auxiliary vehicle can be without wheels.

The plurality of sensors can be located on the prime mover and on the auxiliary vehicle. An embodiment of the method permits the step of verifying that the plurality of sensors are operational after completing the step of connecting the auxiliary vehicle to the prime mover.

The sensors can be used to detect a completed electrical circuit, other integrated circuit system, and combinations thereof, between the prime mover and the auxiliary vehicle by using a device in communication with one of the plurality of sensors, such as a voltmeter for detecting voltage or an ohm meter for detecting resistance. The sensors on the prime mover can communicate with the auxiliary vehicle lighting system by detecting the completed electrical circuit, when the lighting system of the auxiliary vehicle is connected to, or plugged into, the lighting system of the prime mover. For example, the lighting system of the auxiliary vehicle can include a wiring harness with a plug that, when connected to the wiring harness of the prime mover, provides a resistance that can be detected, when the connection is completed.

In an alternative embodiment, sensors located on the auxiliary vehicle can be wireless sensors that can communicate directly with the processor of the electronic stability enhancing system located on the prime mover via a wireless system.

The embodiments of the method include a computer with at least one processor that can be located on the prime mover and can communicate with a plurality of sensors located on the prime mover, the auxiliary vehicle, and combinations thereof, to detect force values, motion values, and combinations thereof.

Examples of these sensors can include a proximity braking sensor manufactured by Bently Nevada of Houston, Tex., for providing information on the motion of a brake shoe in braking applications, a position sensor manufactured by Systron Donner of Concord, Calif., for sensing a position of the brake shoe relative to the sensor as an indication of the application of the braking system, and a position sensor manufactured by Bently Nevada of Houston, Tex., for sensing a wheel placement in relation to the control arm regarding suspension characteristics of the prime mover and auxiliary vehicle.

Other examples of sensors can be force sensors manufactured by Sensor Developments, Incorporated of Orion, Mich., and Futek of Irvine, Calif., can be used to provide information to regulate lateral forces, vertical forces, circumferential forces, and coupling forces on the prime mover and auxiliary vehicle including: a lateral force, a braking force on the assembly, or a side wind gust force.

Force sensors on the prime mover and on the auxiliary vehicle can provide input for maintaining centers of gravity to prevent rollover with respect to the prime mover and auxiliary vehicle combination. Motion sensors can be used to provide information with regard to translational motions and angular motions of the prime mover and auxiliary vehicle combination. For example, translational motions can include lateral acceleration and deceleration motions, and angular motions can include yaw angle, yaw rate, pitch angle, pitch rate, and roll rate. The input from the sensors and the resulting computer instructions can provide optimization regarding specifications and characteristics of the prime mover and auxiliary vehicle combination to reduce dangerous motions of the combination, such as sway, pitch, roll, yaw, and combinations thereof, in order to provide a much improved electronic stability enhancing control system.

More examples of sensors that are usable herein, include motion sensors, such as displacement sensors, velocity sensors, or acceleration/deceleration sensors.

Displacement sensors, such as a string potentiometer, made by Space Age Corporation can be included to provide information on the angle between the trailer and the tow-vehicle.

Systron Donner of Concord, Calif., provides velocity sensors that are, for example, roll rate transducers and yaw rate transducers for monitoring the yaw, roll, and pitch velocities. These sensors can be used to provide information on motion relative to braking or wheel movement.

Acceleration sensors, such as lateral or longitudinal accelerometers made by Systron Donner, provide acceleration information on the tow-vehicle regarding lateral acceleration or longitudinal acceleration.

Other examples of sensors include wheel speed sensors manufactured by Systron Donner of Concord, Calif., and Bently Nevada of Houston, Tex., that can be used for providing information on the prime mover and auxiliary vehicle combination speed and acceleration/deceleration.

Another example of a sensor that can be included in an embodiment can be a yaw sensor. Yaw sensors can be used for providing information regarding rotary movements of the prime mover and auxiliary vehicle combination and for altering the spin or plow motions of either the prime mover or the auxiliary vehicle.

Other examples of sensors usable herein are torque sensors and steering wheel angle sensors. Torque sensors can be manufactured by Systron Donner of Concord, Calif., and Futek of Irvine, Calif., for providing information on braking or wheel traction. Steering wheel angle sensors can be manufactured by Systron Donner of Concord, Calif., and can provide information concerning the steering torque in a given maneuver of the prime mover and auxiliary vehicle combination.

The embodiments of the method include a control and stability strategy that uses the prime mover sensors and the auxiliary vehicle sensors for inputting information to the processor for the auxiliary stability enhancing system and the processor in the on-board computer for the electronic stability enhancing system, which in turn has computer instructions for assisting the driver in situations where forces and motions exceed preset limits or threshold values for the prime mover, the auxiliary vehicle, and the combination.

The processor in the on-board computer includes a memory with computer instructions for communicating with a database storage and for conducting comparative analyses. The database storage contains specifications representing the prime mover and specifications representing the auxiliary vehicle that can be compared to at least one detected force value, at least one detected motion value, and combinations thereof. These comparisons of force and motion values to specifications can be performed to determine if any of the at least one detected force values, at least one detected motion values, and combinations thereof, exceed any of the known preset threshold values for the prime mover connected to the auxiliary vehicle and to determine a corrective action in the event that a threshold value is exceeded.

For example, the computer instructions can adjust the engine power of the prime mover to alter the at least one motion value, the at least one force value, or combinations thereof, for the prime mover connected to the auxiliary vehicle.

Specifications on the prime mover can include such characteristics as: prime mover length, prime mover height, prime mover width, prime mover weight, prime mover inertia value, prime mover wheel configurations, prime mover tire characteristics, prime mover suspension characteristics, and combinations thereof.

Specifications on the auxiliary vehicle include such characteristics as: auxiliary vehicle length, auxiliary vehicle width, auxiliary vehicle height, auxiliary vehicle weight, auxiliary vehicle configurations, auxiliary vehicle wheel sizes, auxiliary vehicle wheel diameters, auxiliary vehicle tire characteristics, auxiliary vehicle suspension characteristics, auxiliary vehicle dimensional characteristics, auxiliary vehicle inertia values, and combinations thereof.

Auxiliary vehicle dimensional characteristics can include information on where the wheels are located relative to the point of connection of the auxiliary vehicle to the prime mover. Auxiliary vehicle tire characteristics can include force and moment characteristics which describe how a tire works and how forces are generated on the tires by such motions relating to the cornering of the tires, angles of the tires in relation to the ground, air content and stiffness of the tire, and other such parameters. Auxiliary vehicle suspension characteristics include the placement of the wheels and how a wheel moves with the forces exerted on the wheel, which can involve other characteristics such as shock absorber characteristics and other suspension part characteristics. Auxiliary vehicle wheel configuration refers to the number of tires and where each tire is located in relation to the other tires. For example a semi-truck can have a dual tire configuration, whereas a car would have a single tire configuration.

The preset limit referred to in the invention is the limit that has been preinstalled in the memory of the electronic stability enhancing system and the auxiliary stability enhancing system, wherein the preinstalled limit is based on specifications of the prime mover, the auxiliary vehicle, or the prime mover and auxiliary vehicle combination, and the preset limits should not be exceeded during towing.

The next steps of the method include selectively applying a calculated response, such as selectively applying braking to at least one wheel of the prime mover to reduce the detected force value, the detected motion value, or combinations thereof, that exceeds the preset threshold value for the prime mover connected to the auxiliary vehicle.

The steps of the method can continue with the step of applying braking to at least one wheel of the auxiliary vehicle. Certain embodiments of the method permit the use of the specifications representing the prime mover and the specifications representing the auxiliary vehicle to reduce such motions as yaw, pitch, and roll of the prime mover connected to the auxiliary vehicle.

In an embodiment, the method includes the step of calculating an adjustment value for the prime mover connected to the auxiliary vehicle to adjust the detected at least one force value, the detected at least one motion value, and combinations thereof. The adjustment value can include: a braking force value, a lateral force value, a translational motion value, an angular motion value, a coupling force value, a steering input value, a steering torque value, a steering rate value, a vehicle speed value, a wheel speed value, a wheel angle value, a braking pressure value, a throttle position value, a brake pedal position value, and combinations thereof.

Certain embodiments of the method can include the step of further adjusting the selective response, such as further adjusting the selective braking motion if the reduced force, motion, and combinations thereof, causes excessive motions, such as yaw, pitch, roll, sway, sliding, jackknifing, and combinations thereof, of the prime mover connected to the auxiliary vehicle.

With reference to the figures, FIG. 1 depicts a flow diagram of an embodiment of a method for stabilizing a prime mover connected to an auxiliary vehicle. The method can begin by connecting an auxiliary vehicle to a prime mover with an electronic stability enhancing system and an auxiliary stability enhancing system (Step 400). The stability enhancing systems can include a computer with at least one processor with a memory having computer instructions for communicating with a plurality of sensors and a database storage. The plurality of sensors can be located on the prime mover and the auxiliary vehicle. The database storage can contain specifications representing the prime mover and specifications representing the auxiliary vehicle.

Next, a completed electrical circuit, other integrated circuit system, and combinations thereof, can be detected between the prime mover and the connected auxiliary vehicle by using a device in communication with the plurality of sensors (Step 405). An example of a device that can be used to detect the presence of a connection with the auxiliary vehicle and the prime mover can be a voltmeter to measure voltage or an ohm meter to detect resistance.

Then, at least one force value, at least one motion value, and combinations thereof, can be detected for the prime mover connected to the auxiliary vehicle by using the plurality of sensors (Step 410). After the values have been detected, the detected force value, the detected motion value, and combinations thereof can be compared with the specifications representing the prime mover and the specifications representing the auxiliary vehicle (Step 415).

The comparative analyses can be conducted using computer instructions to determine if the detected at least one force value or the detected at least one motion value exceeds a known preset threshold value, or preset limit, for the prime mover connected to the auxiliary vehicle (Step 420). A preset limit or threshold value can be a limit that has been preinstalled in the memory of the electronic stability enhancing system, wherein the preinstalled limit is based on specifications of the prime mover, the auxiliary vehicle, or the prime mover and the auxiliary vehicle assembly, and the preset limit should not be exceeded during towing or the system will engage.

If the detected at least one force value or the detected at least one motion value does not exceed a known preset threshold value, or preset limit, for the prime mover connected to the auxiliary vehicle, then the method enables the plurality of sensors to continue monitoring and detecting the force values and motion values for the prime mover and the auxiliary vehicle (Step 410).

If the detected at least one force value or the detected at least one motion value exceeds a known preset threshold value, or preset limit, for the prime mover connected to the auxiliary vehicle, then the method continues by using the computer model, that includes the prime mover specifications and characteristics and the auxiliary vehicle specifications and characteristics to calculate the appropriate force value, motion value, or combination thereof, in response to the detected force value, detected motion value, or other characteristic that is exceeding the preset threshold value (Step 425).

Then, the method includes selectively applying the calculated response force value, motion value, or combination thereof, such as braking to at least one wheel of the prime mover and/or auxiliary vehicle to reduce the detected force value or the detected motion value that exceeds the preset threshold value or that can exceed the preset threshold value if corrective action is not applied (Step 430).

Adjustment values for the prime mover connected to the auxiliary vehicle can be calculated to adjust the detected at least one force value, the detected at least one motion value, and combinations thereof. Then, the calculated adjustment can be adjusted further if the reduced force, motion, and combinations thereof, of the prime mover connected to the auxiliary vehicle causes excessive motions, such as excessive yaw, pitch, roll, sway, sliding, jackknifing, and combinations thereof.

If further adjustments for stability and control of the prime mover connected to the auxiliary vehicle are not required, then the method enables the plurality of sensors to continue monitoring and detecting the force values and motion values for the prime mover and the auxiliary vehicle (Step 410).

Figure 2:
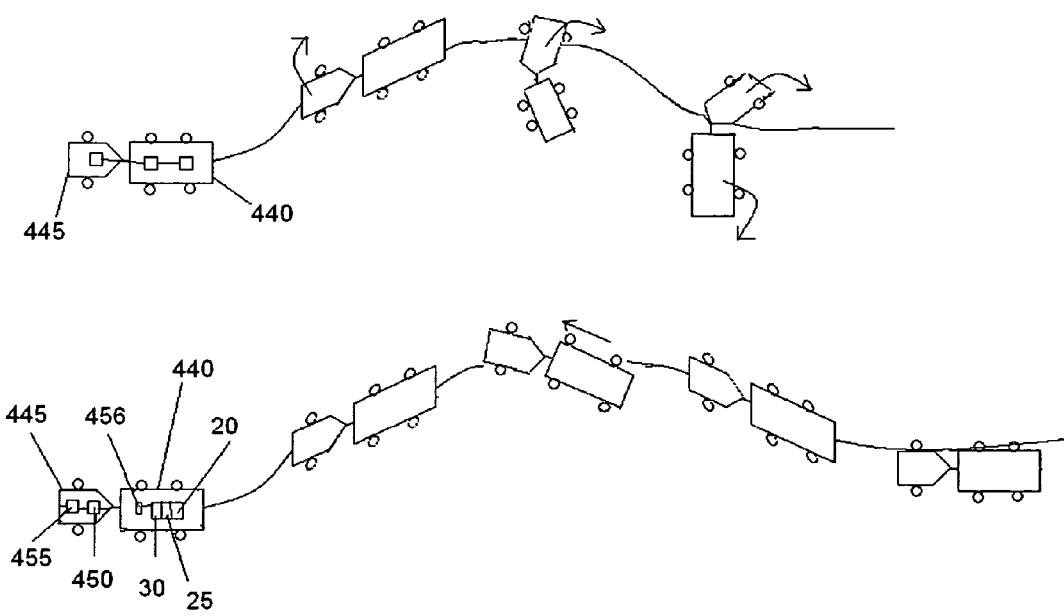
FIG. 2 depicts an embodiment of a state in which a condition causes a yaw oscillation of the prime mover and auxiliary vehicle, and braking actions are applied to the prime mover and/or auxiliary vehicle to assist in stabilizing the prime mover and auxiliary vehicle combination.

FIG. 2 depicts an embodiment of a state in which a vehicle response is exceeded or controlled depending on the use of a method for stabilizing a prime mover (440) connected to an auxiliary vehicle (445). A motion of the combination prime mover (440) connected to the auxiliary vehicle (445) can be a large-angular motion of the auxiliary vehicle in relation to the prime mover which results in an oscillating yaw motion, which builds into a phenomenon called jackknifing. In this situation, the motion of the prime mover and the auxiliary vehicle exceed a certain threshold value and, with a certain speed, motion, and force, the result can be a loss of control of the prime mover and the auxiliary vehicle combination as depicted in the situation without the method for stability enhancement of the prime mover (440) connected to the auxiliary vehicle (445).

A driver's handling of the combination of a prime mover (440) connected to an auxiliary vehicle (445) prior to exceeding the angle threshold value is important as the driver may not apply the proper inputs of steering or braking, at all times. Accordingly, sensors, such as force sensors, angular motion sensors, translational motion sensors, wheel speed sensors, and other sensors can provide information on motions, forces, speed, and braking for guidance to the processor (450) of the auxiliary stability enhancing system for combining with information regarding the specifications of the auxiliary vehicle that reside in the database storage (455).

Next, the processor for the auxiliary stability enhancing system can communicate with the processor (25) for the electronic stability enhancing system (20) to provide information on motions, forces, speed, and braking. The electronic stability enhancing system (20) includes the processor (25) with a memory (30) and a database storage (456), for storing and processing the received or input information regarding the prime mover and the auxiliary vehicle combination.

Next, comparative analyses can be conducted by the processors in communication with the database storages and in communication with the electronic stability enhancing system (20). The analyses compare the detected force values, detected motion values, and combinations thereof, with known preset threshold values. These comparisons can be completed in real time to determine if any of the detected force values or detected motion values have exceeded the known preset threshold values.

If the threshold values have been exceeded, then computer instructions stored in the memory (30) of the processor (20) for the electronic stability enhancing control system can be used to calculate an appropriate response to reduce the detected force value or detected motion value that has exceeded the preset threshold value.

The electronic stability enhancing control system includes a computer model, with the specifications and characteristics of the prime mover and the connected auxiliary vehicle combination. The responses for reducing the detected force values and the detected motion values are determined by using the computer model and computer instructions to calculate the response as well as where on the prime mover (440) and/or auxiliary vehicle (445) to apply the calculated response in order to maintain and enhance stability of the prime mover and the auxiliary vehicle, which may reduce the occurrence of this type of phenomenon, in some situations. The method provides for the calculation of further adjustment values, in real time, for the prime mover connected to the auxiliary vehicle to further adjust the detected at least one force, the detected at least one motion, and combinations thereof, to enhance stability.

While these embodiments have been described with emphasis on the embodiments, it should be understood that within the scope of the appended claims, the embodiments might be practiced other than as specifically described herein.

What is claimed is:

1. A method for stabilizing a prime mover connected to an auxiliary vehicle, wherein the method comprises:
   a. connecting an auxiliary vehicle to a prime mover with an auxiliary stability enhancing system and an electronic stability enhancing system, wherein the electronic stability enhancing system comprises a processor with a memory, wherein the processor is in communication with a plurality of sensors and a database storage, wherein the database storage contains specifications representing the prime mover and specifications representing the auxiliary vehicle and wherein the specifications represent at least a length, a width, a height, a wheel base dimension, a wheel size for the prime mover and the auxiliary vehicle;
   b. detecting at least one motion value, for the prime mover connected to the auxiliary vehicle, and for the auxiliary vehicle connected to the prime mover using the plurality of sensors;
   c. comparing the detected motion values with the specifications representing the prime mover and the specifications representing the auxiliary vehicle to determine if any of the detected motion values for the prime mover and the auxiliary vehicle exceed a preset threshold value for the prime mover connected to the auxiliary vehicle; and
   d. selectively applying braking to at least one wheel of the prime mover, the auxiliary vehicle, or combinations thereof, to reduce the detected motion value that exceeds the preset threshold value for the prime mover connected to the auxiliary vehicle.

2. The method of claim 1, further comprising the step of verifying that the plurality of sensors are operational after completing the step of connecting the auxiliary vehicle to the prime mover.

3. The method of claim 1, further comprising the step of applying braking to at least one wheel of the auxiliary vehicle.

4. The method of claim 1, further comprising the step of calculating an adjustment value for the prime mover connected to the auxiliary vehicle to adjust the detected at least one motion value, wherein the adjustment value comprises a member selected from the group consisting of: a translational motion value, an angular motion value, a steering input value, a steering torque value, a steering rate value, a vehicle speed value, a wheel speed value, a wheel angle value, a braking pressure value, a throttle position value, a brake pedal position value, and combinations thereof.

5. The method of claim 1, further comprising the step of further adjusting the selective braking motion if the reduced motion, of the prime mover connected to the auxiliary vehicle causes excessive yaw, pitch, roll, sway, sliding, jackknifing, and combinations thereof.

6. The method of claim 1, further comprising the step of using the specifications representing the prime mover and the specifications representing the auxiliary vehicle to reduce yaw, pitch, and roll of the prime mover connected to the auxiliary vehicle when at least one characteristic exceeds a preset limit.

7. The method of claim 1, further comprising the step of detecting at least one of a completed electrical circuit, or another integrated circuit system, wherein the completed electrical circuit or the another integrated circuit system is in communication with the prime mover and the auxiliary vehicle using a device in communication with one of the plurality of sensors on the prime mover.

8. The method of claim 1, further comprising the step of communicating directly with the processor located on the prime mover by using a wireless sensor.

* * * * *